R. S. BARNUM & H. C. GOODRICH.
Devices for Sharpening Needles.
No. 142,552. Patented September 9, 1873.
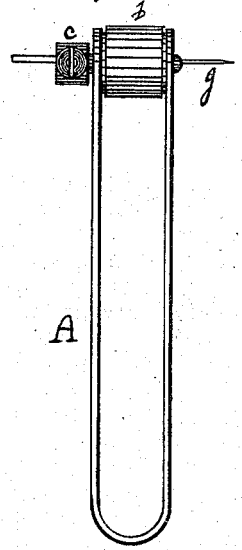
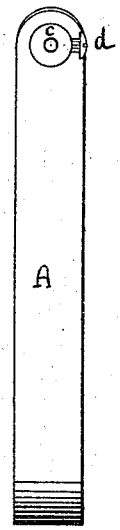
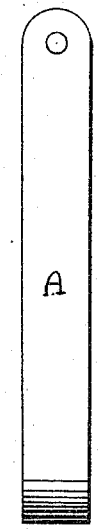
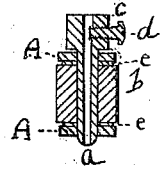
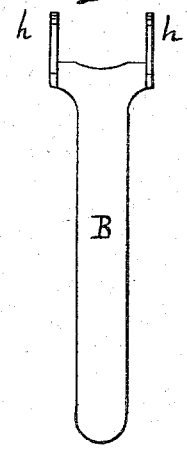
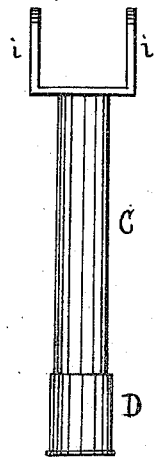
Witnesses. Inventors.

UNITED STATES PATENT OFFICE.

RUSSEL S. BARNUM AND HARRY C. GOODRICH, OF CHICAGO, ILLINOIS; SAID BARNUM ASSIGNOR TO SAID GOODRICH.

IMPROVEMENT IN DEVICES FOR SHARPENING NEEDLES.

Specification forming part of Letters Patent No. 142,552, dated September 9, 1873; application filed January 6, 1873.

*To all whom it may concern:*

Be it known that we, RUSSEL S. BARNUM and HARRY C. GOODRICH, of the city of Chicago, in the county of Cook and State of Illinois, have invented certain new and useful Improvements in Devices for Sharpening Needles, of which the following is a full description, reference being had to the accompanying drawings making a part of this specification, in which—

Figure 1 is a plan view; Fig. 2, a view of one side; Fig. 3, a view of the opposite side of the handle. Fig. 4 shows the spindle upon which the rubber is to be placed. Fig. 5 shows the spindle and rubber thereon in section; Figs. 6 and 7, plan and side views of a handle which may be used in place of that shown in Figs. 1, 2, and 3; and Fig. 8 shows another form of the device.

The drawings are full size.

The points of sewing-machine needles frequently become broken, and it becomes necessary to sharpen the same. This is now usually done by rubbing the same on a whetstone—a slow and unsatisfactory process. The object of our invention is to furnish an instrument by the use of which, in connection with suitable sharpening-surfaces, needles and similar instruments can be rapidly and perfectly sharpened.

In the drawings, A A represent a piece of metal, bent into the form shown, having a hole near each end to receive a hollow spindle, $a$. On this spindle, between the two parts of the handle A, is a wheel or roller, $b$, made of rubber or any other suitable material. On one end of the spindle $a$ is a head, $c$, for the purpose of receiving a thumb or set screw, $d$. $ee$ are washers placed between the rubber and the bearings of the spindle $a$. The rubber $b$, or the material which takes its place, must closely fit or be secured to the spindle.

In use the needle $g$ is passed through the hollow spindle, as represented in Fig. 1, and is held in place by means of the screw $d$.

By holding the wheel $b$ against any revolving wheel the needle $g$ will be made to revolve rapidly, and by holding a hone so that the point of the needle will revolve against the same the needle will be very rapidly and perfectly sharpened, the point being at the center of the needle, instead of at one side, as is liable to be the case when sharpened in the ordinary way.

We do not limit ourselves to the handle, or device for holding the spindle and wheel, represented in Figs. 1, 2, and 3. Various devices may be used for that purpose, one of which is represented in Figs. 6 and 7, in which B forms the handle proper, and $h\ h$ are the bearings for the spindle.

Another form of the device is represented in Fig. 8, in which C D represents the handle, and $i\ i$ the bearings for the spindle $a$. The part C of the handle is round and hollow, and is provided with a tightly-fitting cover, D, forming a receptacle in which to keep needles not in use.

This device is primarily designed to be used in connection with a sewing-machine, and in use may be held against any one of its revolving wheels; but it is adapted to other similar uses, and may be used in other places. It may also be used with considerable success by moving the wheel $b$, by hand, back and forth over a block or any hard material, at the same time, with the other hand, holding the hone in the proper position at the point of the needle.

What we claim as new is as follows:

The device herein described, consisting essentially of the handle C, hollow spindle $d$, and wheel $b$, constructed and arranged to operate substantially as and for the purpose herein specified.

RUSSEL S. BARNUM.
HARRY C. GOODRICH.

Witnesses:
E. A. WEST,
O. W. BOND.